(12) United States Patent
Jiang et al.

(10) Patent No.: US 12,166,707 B2
(45) Date of Patent: Dec. 10, 2024

(54) MULTIPLE TRANSMISSION SCHEMES IN WIRELESS COMMUNICATION

(71) Applicant: ZTE Corporation, Guangdong (CN)

(72) Inventors: Chuangxin Jiang, Guangdong (CN); Zhaohua Lu, Guangdong (CN); Yu Ngok Li, Guangdong (CN); Shujuan Zhang, Guangdong (CN); Zhen He, Guangdong (CN); Bo Gao, Guangdong (CN); Xinquan Ye, Guangdong (CN); Huahua Xiao, Guangdong (CN)

(73) Assignee: ZTE Corporation, Shenzhen (CN)

( * ) Notice: Subject to any disclaimer, the term of this patent is extended or adjusted under 35 U.S.C. 154(b) by 763 days.

(21) Appl. No.: 17/401,972

(22) Filed: Aug. 13, 2021

(65) Prior Publication Data

US 2022/0021499 A1    Jan. 20, 2022

Related U.S. Application Data

(63) Continuation of application No. PCT/CN2019/074975, filed on Feb. 13, 2019.

(51) Int. Cl.
*H04L 5/00* (2006.01)
*H04J 4/00* (2006.01)
(Continued)

(52) U.S. Cl.
CPC ............ *H04L 5/0048* (2013.01); *H04L 1/189* (2013.01); *H04L 1/1896* (2013.01)

(58) Field of Classification Search
CPC ..... H04L 5/0048; H04L 1/189; H04L 1/1896; H04L 1/04; H04L 5/0094; H04L 1/08;
(Continued)

(56) References Cited

U.S. PATENT DOCUMENTS 9,265,076 B2    2/2016    Schmidt et al.
10,292,147 B2   5/2019    Tiirola et al.
(Continued)

FOREIGN PATENT DOCUMENTS

CN    104349491 A    2/2015
CN    105359429 A    2/2016
(Continued)

OTHER PUBLICATIONS

Japanese office action issued in JP Patent Application No. 2021-547418, dated Feb. 10, 2023, 6 pages. English translation included.
(Continued)

*Primary Examiner* — Omar J Ghowrwal
(74) *Attorney, Agent, or Firm* — Perkins Coie LLP

(57) ABSTRACT

Methods, systems, and devices for multiple transmission schemes in wireless communication are described. In one aspect, a wireless communication method is disclosed to include: transmitting, by a first communication device, at least one of i) a repetition mode of data transmissions to be sent to a second communication device, ii) a mapping between N indicated beams and all scheduled transmissions of the data, or iii) a RV (Redundant Version) relationship among the all scheduled transmissions of the data, wherein the transmitting is based on at least one of the N indicated beam(s), a DMRS (Demodulation Reference Signals) port indication, or K time domain occasions, N and K being non-negative integers.

24 Claims, 14 Drawing Sheets

(51) Int. Cl.
  *H04L 1/00*     (2006.01)
  *H04L 1/08*     (2006.01)
  *H04L 1/1867*   (2023.01)
  *H04W 72/044*   (2023.01)
  *H04W 72/0446*  (2023.01)
  *H04W 72/0453*  (2023.01)
  *H04W 72/1273*  (2023.01)
  *H04W 72/23*    (2023.01)
  *H04W 72/231*   (2023.01)
  *H04W 72/232*   (2023.01)
  *H04B 7/06*     (2006.01)
  *H04L 1/04*     (2006.01)

(58) Field of Classification Search
  CPC ... H04L 1/0003; H04L 5/0051; H04B 7/0695; H04W 72/23; H04W 72/0446; H04W 72/0453; H04W 72/046; H04W 72/1273; H04W 72/232; H04W 72/231; H04J 4/00
  See application file for complete search history.

(56) References Cited

U.S. PATENT DOCUMENTS

| | | | |
|---|---|---|---|
| 10,554,262 B2 | 2/2020 | John Wilson et al. | |
| 11,564,218 B2 | 1/2023 | Zhang et al. | |
| 2016/0227521 A1 | 8/2016 | Han et al. | |
| 2018/0014254 A1 | 1/2018 | Hwang et al. | |
| 2018/0070343 A1 | 3/2018 | Chen et al. | |
| 2018/0343653 A1 | 11/2018 | Guo | |
| 2020/0153581 A1* | 5/2020 | Tsai | H04W 24/10 |
| 2021/0337548 A1* | 10/2021 | Gao | H04L 5/0023 |
| 2022/0191892 A1* | 6/2022 | Muruganathan | H04B 7/0695 |

FOREIGN PATENT DOCUMENTS

| | | | |
|---|---|---|---|
| CN | 106559902 A | 4/2017 | |
| CN | 107005376 A | 8/2017 | |
| CN | 108199819 A | 6/2018 | |
| TW | 201902158 A | 1/2019 | |

OTHER PUBLICATIONS

Huawei et al, "Enhancements on multi-TRP/panel transmission," 3GPP TSG RAN WG1 Ad-Hoc Meeting 1901, R1-1900017, Taipei, Jan. 21-25, 2019, 16 pages.
Japanese notice of allowance issued in JP Patent Application No. 2021-547418, dated Dec. 5, 2023, 4 pages. English translation included.
Singapore search report and written opinion issued in SG Patent Application No. 11202108842T, dated Oct. 30, 2023, 11 pages.
Korean office action issued in KR Patent Application No. 10-2021-7028986, dated Aug. 12, 2024, 8 pages. English translation included.
Chinese Notification to Complete Formalities of Registration issued in CN Patent Application No. 202210347245.6, dated Jul. 19, 2024, 7 pages. English translation included.
European Patent Office, extended European Search Report dated Sep. 9, 2022 for European Patent Application No. 19914919.6, 9 pages.
Ericsson, "On multi-TRP and multi-panel," 3GPP TSG RAN WG1 Meeting Ad-Hoc Meeting 1901, Taipei, Taiwan, Jan. 21-25, 2019, R1-1900728, 9 pages.
Huawei, et al., "Enhancements on multi-TRP/panel transmission," 3GPP TSG RAN WG1 Meeting #95, Spokane, USA, Nov. 12-16, 2018, R1-1812243, 9 pages.
NTT Docomo, Inc., "Enhancements on multi-TRP/panel transmission," 3GPP TSG RAN WG1 Ad-Hoc Meeting 1901, Taipei, Jan. 21-25, 2019, R1-19000978, 19 pages.
Co-Pending Australian Application No. 2019429440, Australian Examination Report dated Nov. 18, 2022, 3 pages.
Japanese office action issued in JP Patent Application No. 2021-547418, dated Jul. 3, 2023, 7 pages. English translation included.
Australian examination report issued in AU Patent Application No. 2019429440, dated Jul. 10, 2023, 4 pages.
Australian notice of acceptance issued in AU Patent Application No. 2019429440, dated Oct. 31, 2023, 3 pages.
International Search Report and Written Opinion mailed on Nov. 13, 2019 for International Application No. PCT/CN2019/074975, filed on Feb. 13, 2019 (7 pages).
Vietnamese office action issued in VN Patent Application No. 1-2021-05563, dated Aug. 29, 2024, 4 pages. English translation included.
European Communication pursuant to Article 94(3) EPC issued in EP Patent Application No. 19914919.6, dated Oct. 8, 2024, 6 pages.

* cited by examiner transmitting, by a first communication device, at least one of i) a repetition mode of data transmissions to be sent to a second communication device, ii) a mapping between N indicated beams and scheduled transmissions of the data, or iii) a RV (Redundant Version) relationship among the scheduled transmissions of the data

FIG. 14

MULTIPLE TRANSMISSION SCHEMES IN WIRELESS COMMUNICATION

CROSS-REFERENCE TO RELATED APPLICATIONS

This application is a continuation of International Patent Application No. PCT/CN2019/074975, filed on Feb. 13, 2019, the contents of which are incorporated herein by reference in their entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for multiple transmission schemes in wireless communication. Some implementations of the disclosed technology provide an improved flexibility to support more various scenarios while addressing signaling overhead.

In one aspect, a wireless communication method is provided to include transmitting, by a first communication device, at least one of i) a repetition mode of data transmissions to be sent to a second communication device, ii) a mapping between N indicated beams and scheduled transmissions of the data, or iii) a RV (Redundant Version) relationship among the scheduled transmissions of the data, where the transmitting is based on at least one of the N indicated beam(s), a DMRS (Demodulation Reference Signals) port indication, or K time domain occasions, N and K being non-negative integers.

In another aspect, a wireless communication apparatus comprising a processor configured to perform the disclosed methods is disclosed.

In another aspect, a computer readable medium having code stored thereon is disclosed. The code, when implemented by a processor, causes the processor to implement a method described in the present document.

The above and other aspects and their implementations are described in greater detail in the drawings, the descriptions, and the claims.

BRIEF DESCRIPTION OF THE DRAWINGS

FIG. 14 shows an example of a flowchart of a multiple transmission scheme based on some implementations of the disclosed technology.

DETAILED DESCRIPTION

Section headings are used in the present document only to facilitate ease of understanding and scope of the embodiments and techniques described in each section are not only limited to that section. Furthermore, while 5G terminology is used in some cases to facilitate understanding of the disclosed techniques, which may be applied to wireless systems and devices that use communication protocols other than 5G or 3GPP protocols.

The disclosed technology may be used by implementations to provide multiple transmission schemes in wireless communication. Some implementations of the disclosed technology allow to achieve an improved flexibility to support more various scenarios while addressing signaling overhead. Also, some implementations of the disclosed technology can improve reliability of data transmitted.

DMRS port indication is used to indicate frequency resource partition, or the relationship of frequency resource portions, or the mapping between indicated TCI (Transmission Configuration Indicator) states and scheduled transmissions, or switch among the repetition modes.

In the version of NR (new radio) Release-15, the multi-TRP (transmission receive point) joint transmission is not fully discussed due to time constraints. Therefore, the current NR version does not support data transmission to a same user by multiple TRPs. For the URLLC (Ultra-Reliable and Low Latency Communications) service, how to use the multi-TRP transmission for reliability enhancement has not been discussed either.

The disclosed technology provides multiple transmission schemes in wireless communication which is possible to enhance reliability of data.

Figure 1:
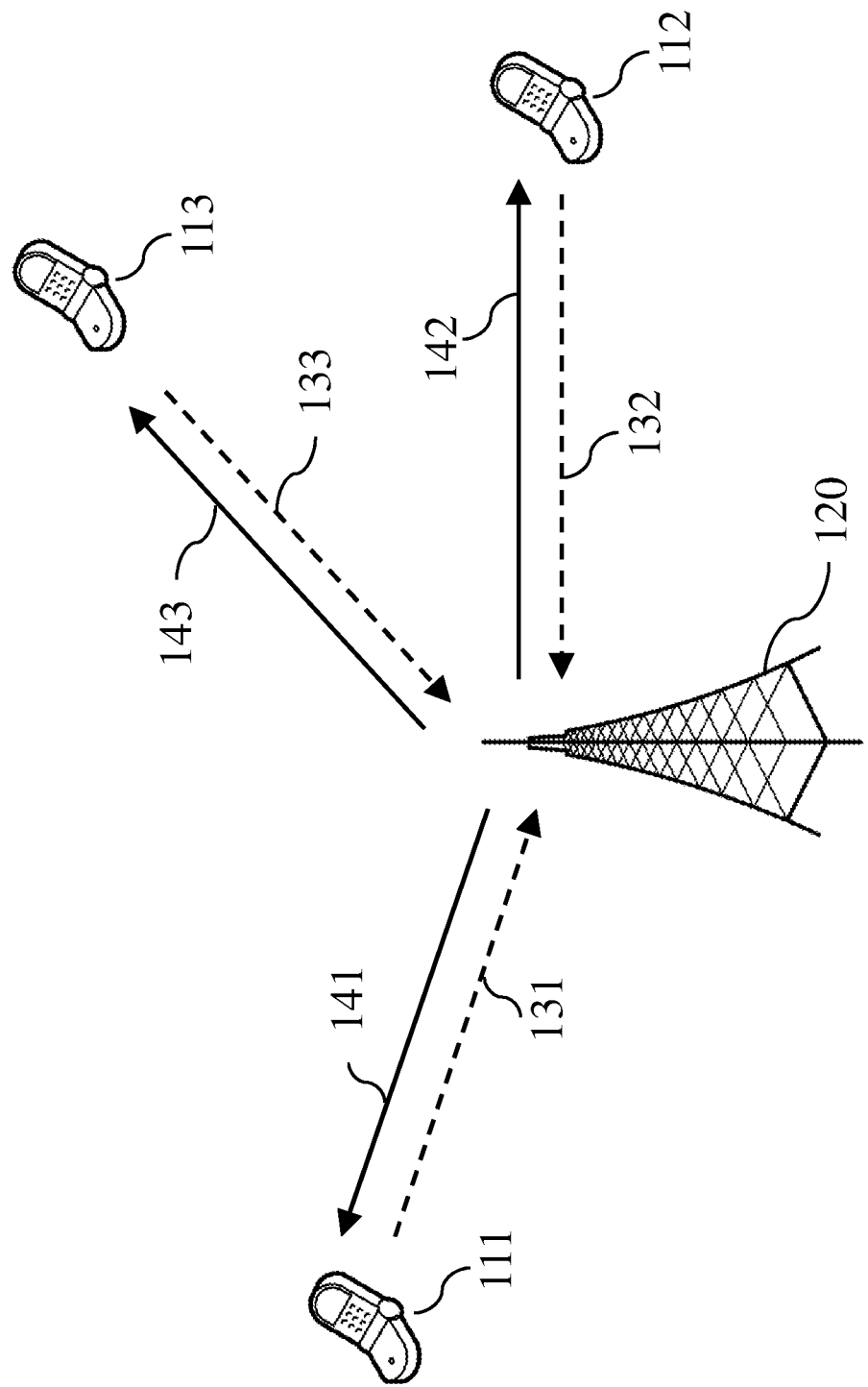
FIG. 1 shows an example of a base station (BS) and a user equipment (UE) in wireless communication based on some implementations of the disclosed technology.

FIG. 1 shows an example of a wireless communication system (e.g., a 5G or NR cellular network) that includes a BS 120 and one or more user equipment (UE) 111, 112, 113. In some embodiments, the UEs access the BS (e.g., the network) using implementations of the disclosed technology (131, 132, 133), which then enables subsequent communication (141, 142, 143) from the BS to the UEs. The UE may be, for example, a smartphone, a tablet, a mobile computer, a machine to machine (M2M) device, an Internet of Things (IoT) device, and so on.

Figure 2:
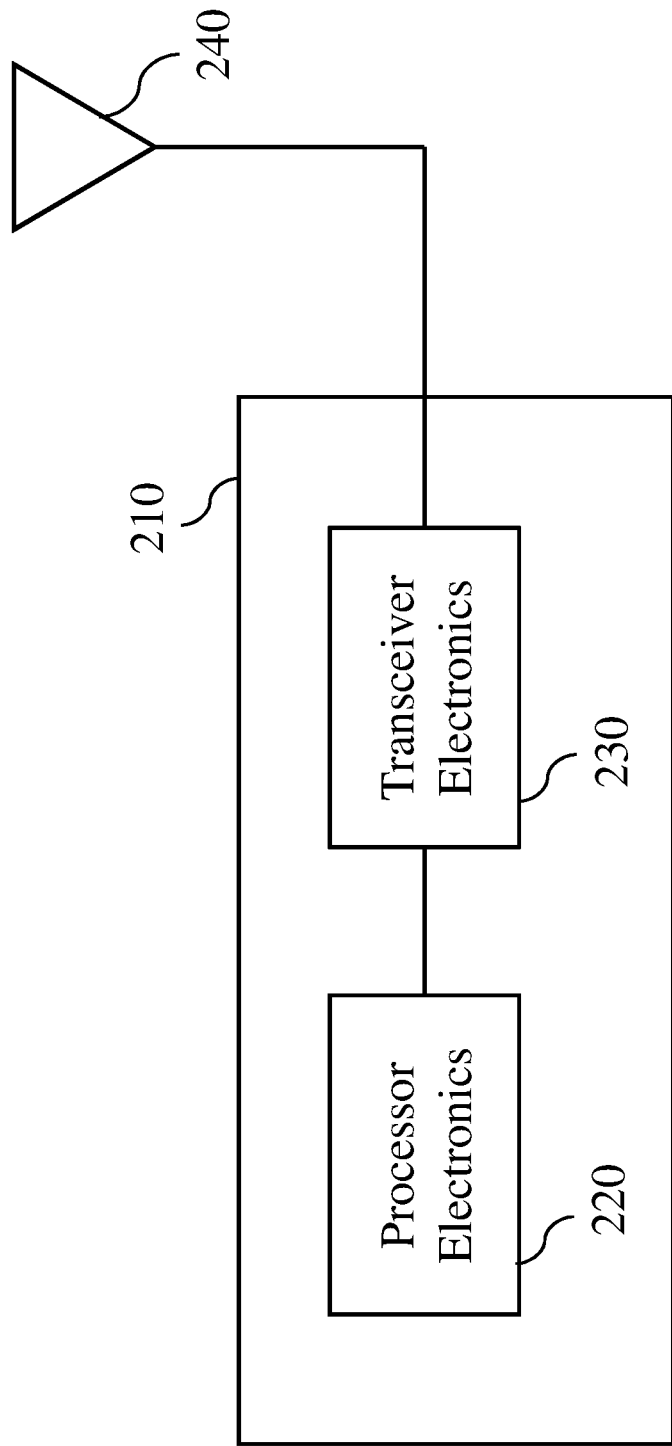
FIG. 2 shows an example of a block diagram of a portion of an apparatus based on some implementations of the disclosed technology.

FIG. 2 shows an example of a block diagram representation of a portion of an apparatus. An apparatus 210 such as a base station or a wireless device (or UE) can include processor electronics 220 such as a microprocessor that implements one or more of the techniques presented in this document. The apparatus 210 can include transceiver electronics 230 to send and/or receive wireless signals over one or more communication interfaces such as antenna 240. The apparatus 210 can include other communication interfaces for transmitting and receiving data. The apparatus 210 can include one or more memories (not explicitly shown) configured to store information such as data and/or instructions. In some implementations, the processor electronics 220 can include at least a portion of transceiver electronics 230. In some embodiments, at least some of the disclosed techniques, modules or functions are implemented using the apparatus 210.

Implementation 1

Figure 3:
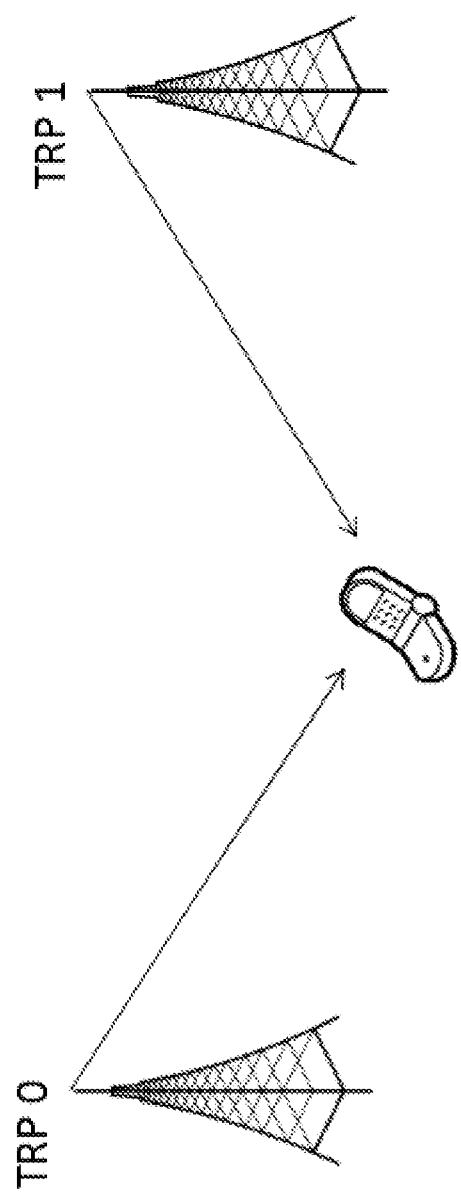
FIG. 3 shows a conceptual diagram showing a multi-TRP (Transmit Receive Point) transmission scheme based on some implementations of the disclosed technology.

FIG. 3 shows a conceptual diagram showing a multi-TRP transmission scheme. In FIG. 3, multiple TRPs including a first TRP (TRP 0) and a second TRP (TRP 1) transmit data to a same user. In a scenario where there is an ideal backhaul between the first TRP and the second TRP, the serving cell of the UE, which is assumed to be the first TRP, can send a PDCCH (Physical Downlink Control Channel) to schedule multiple data streams, for example, multiple transmission layers, for sending data streams. Multiple transmission layers can be sent by each of the first TRP and the second TRP. For example, a DCI format sent by the first TRP schedules four transmission layers for the data transmission which correspond to four DMRS ports. The two layers of the four transmission layers can be from the first TRP, and the remaining two layers of the four transmission layers can be from the second TRP. In this scenario, the R15 solution can support multiple TRP transmissions without major changes, because two cooperative TRPs can dynamically interact, and the control channel is sent mainly by the serving cell.

For URLLC services, a higher level of the transmission reliability is required. At this time, if the first TRP and the second TRP can transmit a same or related data, the probability that the UE detects the correct data is greatly increased, thereby increasing the transmission reliability and reducing the transmission delay.

Figure 4:
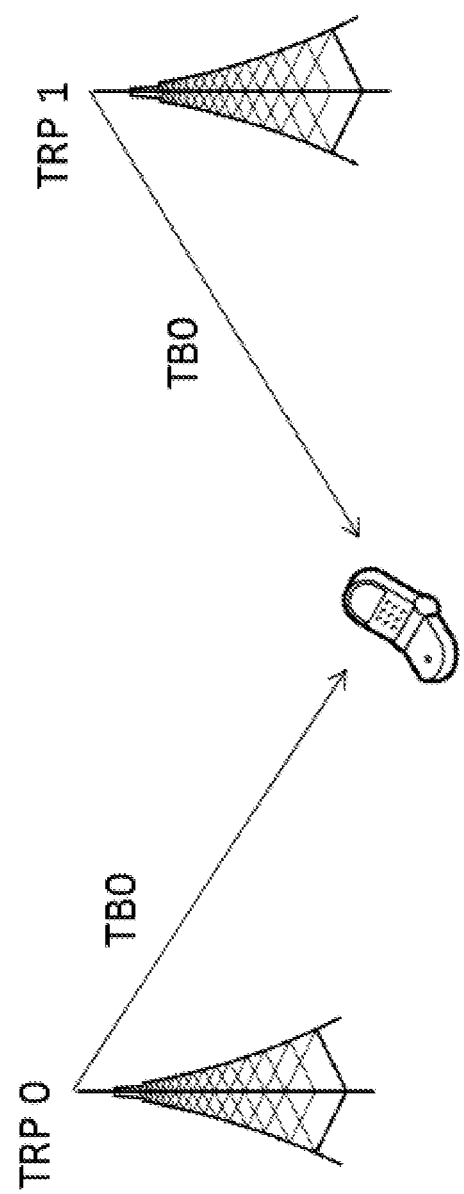
FIG. 4 shows a conceptual diagram showing a multi-TRP transmission scheme to transmit a same data based on some implementations of the disclosed technology.

FIG. 4 shows a conceptual diagram showing a multi-TRP transmission scheme to transmit a same data. In FIG. 4, the first TRP (TRP0) and the second TRP (TRP 1) transmit a same data (TB0). In this case, the repetition of the data occurs since the same data is transmitted twice from the two TRPs including the first TRP and the second TRP.

Figure 5:
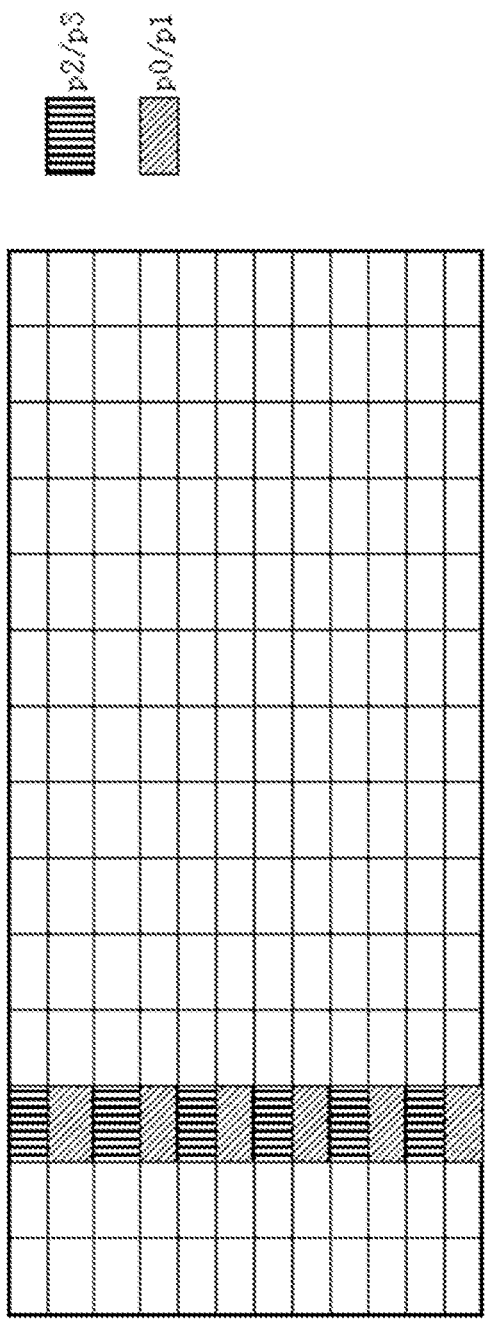
FIGS. 5 to 8 show examples of occupations of DMRS (Demodulation Reference Signals) resources based on some implementations of the disclosed technology.
Figure 6:
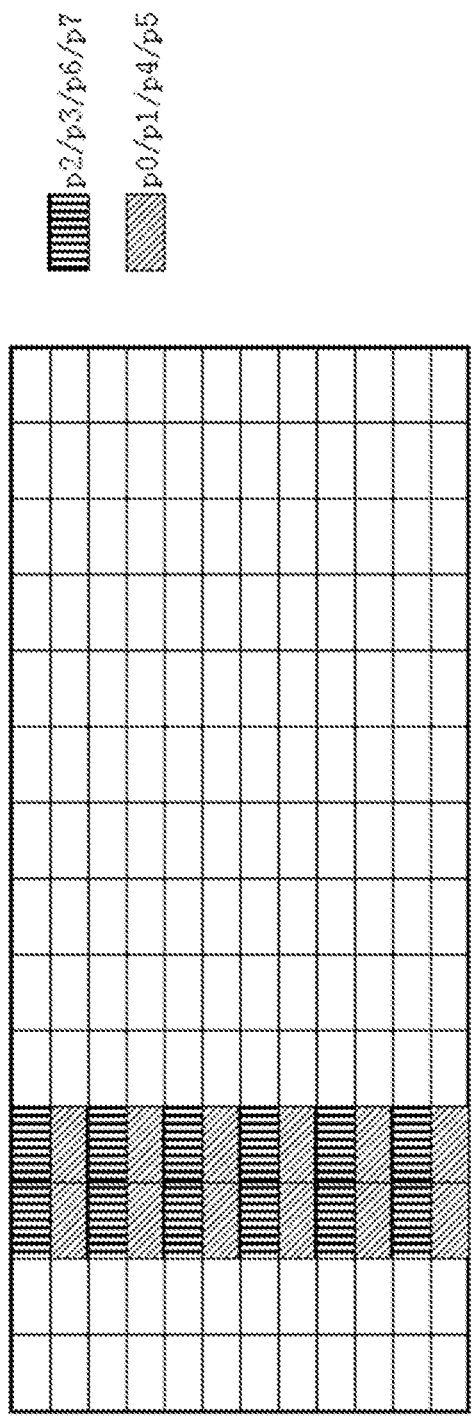
Figure 7:
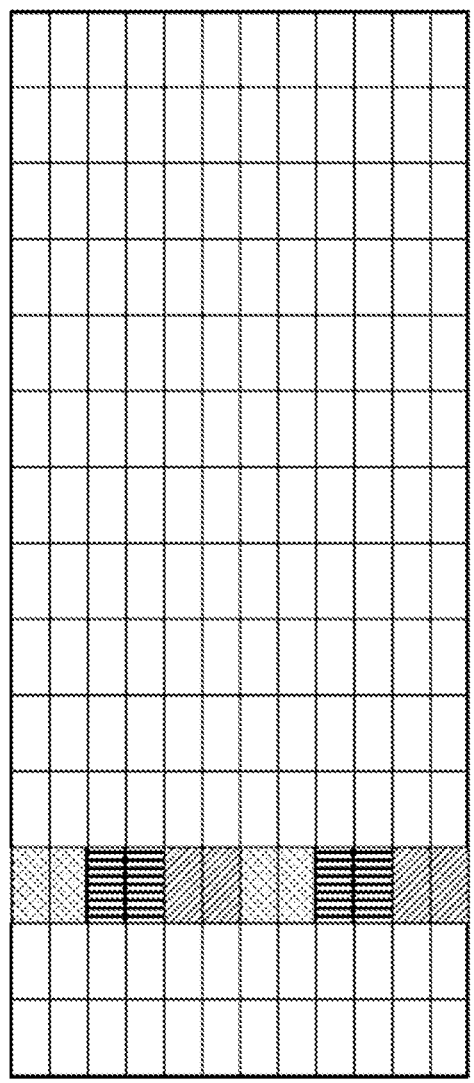
Figure 8:
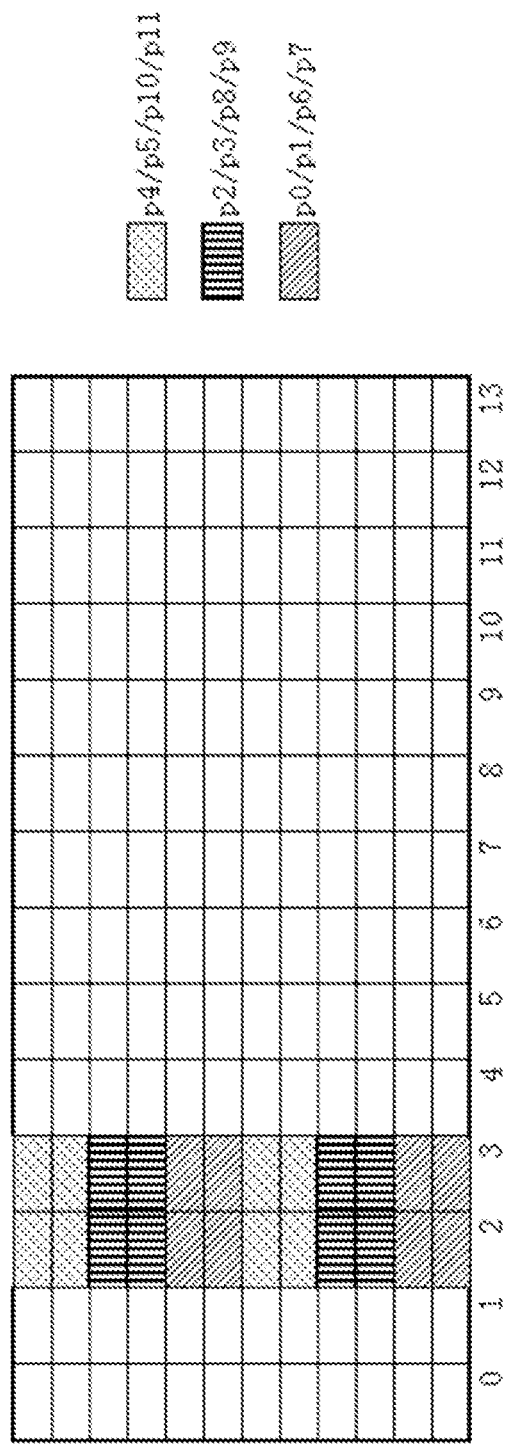

FIGS. 5 to 8 show occupations of DMRS resources. The occupations as shown in FIGS. 5 and 6 support the DMRS type 1 and the occupation as shown in FIGS. 7 and 8 support the DMRS type 2. As shown in FIGS. 5 and 6, for DMRS type 1, all DMRS ports are divided into two CDM (Code Division Multiplexing) groups. The DMRS ports in each CDM group occupy a same time-frequency resources and are distinguished by different OCC (Orthogonal Cover Codes) codes. For the DMRS type 2 as shown in FIGS. 7 and 8, all DMRS ports are divided into three CDM groups, and the DMRS ports in each CDM group occupy the same time-frequency resource and are distinguished by different OCC codes. Since the geographic locations of multiple TRPs may be different, the time-frequency offset synchronization of the downlink transmission of multiple TRPs may be deviated. Therefore, in some implementations, the DMRS ports of multiple TRPs are divided into multiple DMRS port groups, and the DMRS ports of different DMRS port groups are mapped on different CDM groups.

In the case of multi-TRP transmission, transmission layers from multiple TRP are independent for users of the eMBB (Enhanced Mobile Broadband) service or the good channel conditions for the URLLC service. In order to reduce the modification to the existing standard, if the total number of layers of multiple TRP transmissions is less than or equal to four, then a total of one TB is transmitted, and multiple layers corresponding to the TB may be from different TRPs. If the total number of layers is greater than four, then two TBs may be transmitted.

For the URLLC service, especially for UEs that need improved reliability, in one slot, multiple TRPs preferably transmit one TB separately. In order to increase reliability, the TBs of the multiple TRP transmissions may be same or related to each other. When multiple TBs are the same, the RV versions of multiple TBs may be different in order to allow different redundancy versions to be merged at the UE side. Alternatively, layers belong to one TB but from different TRPs can be related or the same.

If there is an ideal backhaul between two TRPs, a single PDCCH can be enough. In other words, a single PDCCH schedules two layer groups or two TBs which are transmitted from two TRPs. In order to keep a same DCI format size, these two layer groups or two TBs can be allocated with the same time and frequency resources. Although the two transmissions are on the same PRBs, they can be indicated with different DMRS port groups which map on different CDM groups, and the orthogonality can be achieved at least for DMRS. Then the interference between these two transmissions can be mitigated. This repetition scheme is denoted as SDM (spatial division multiplexing) repetition in which two layer groups carry the same TB, and the two TBs are mapped on the same time and frequency resources, wherein one layer corresponds to one DMRS port. In other words, the same TB is transmitted twice on different DMRS ports. Since two TRPs have different locations, two TCI states may be indicated for those two transmissions or two DMRS port groups. In this case, two transmissions of data correspond to two repetitions wherein DMRS ports of two transmissions are mapped on different CDM groups.

Figure 9:
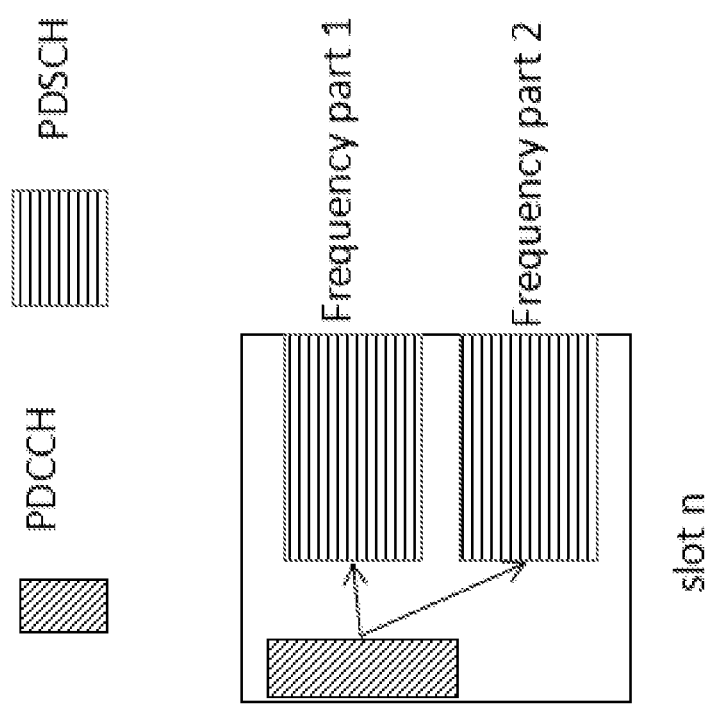
FIG. 9 shows an example of a slot scheduling for FDM (Frequency Division Multiplexing) based on some implementations of the disclosed technology.

Another solution can be used in very low traffic load scenarios. In this case, two TRPs transmit the same TB on different frequency resources in one slot in order to avoid interference between two TRPs. In this case, the same DMRS port(s) can be used for two TRPs. This solution is denoted as FDM (frequency division multiplexing) repetition. Similar with SDM, two TCI states may be indicated for those two transmissions or two frequency portions. FIG. 9 shows an example of a slot scheduling for FDM. As shown in FIG. 9, one single PDCCH schedules one PDSCH which includes two frequency parts corresponding to two indicated TCI states, respectively. In FIG. 9, the frequency part 1 is from one of two TRPs and the frequency part 2 is from the other one of the two TRPs. In this case, two transmissions of data correspond to two repetitions which map on two non-overlapping frequency resource parts.

Figure 10:
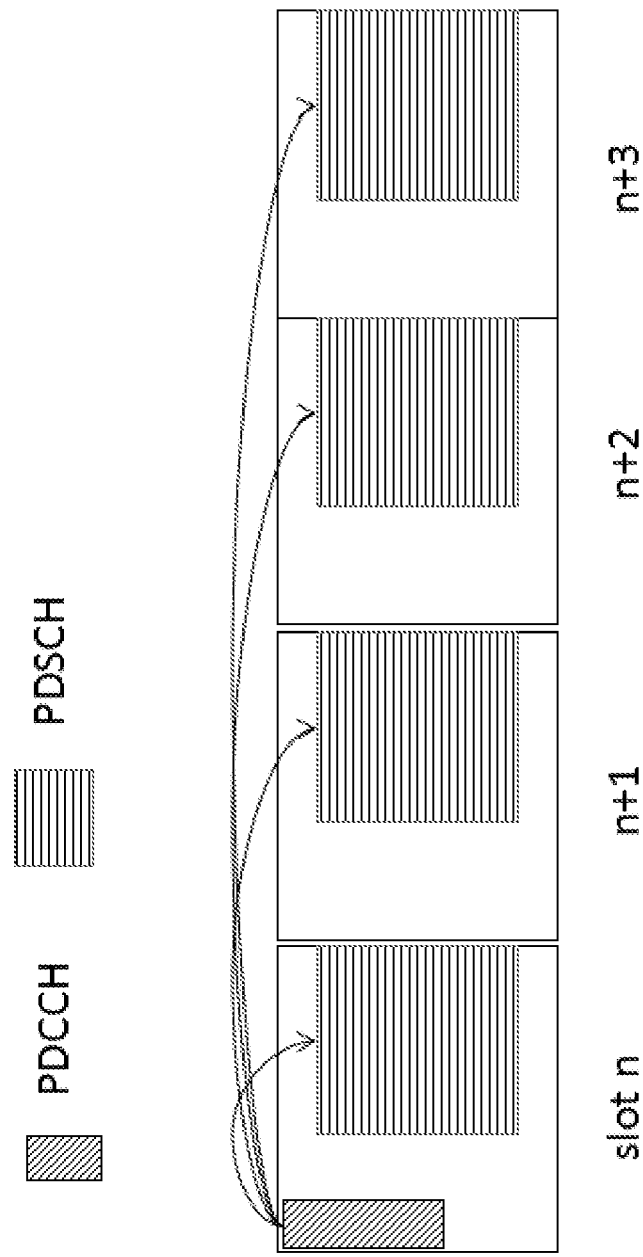
FIG. 10 shows an example of a multiple slot scheduling based on some implementations of the disclosed technology.

For some URLLC UEs with very low SINR, multiple PDSCH scheduling by single PDCCH to transmit the same TB can be supported as Rel-15 solution wherein the same symbol allocation is applied across the pdsch-AggregationFactor consecutive slots. In Rel-15, only one TCI state is indicated for pdsch-AggregationFactor consecutive slots as shown in FIG. 10 which shows an example for a multiple slot scheduling.

Figure 11:
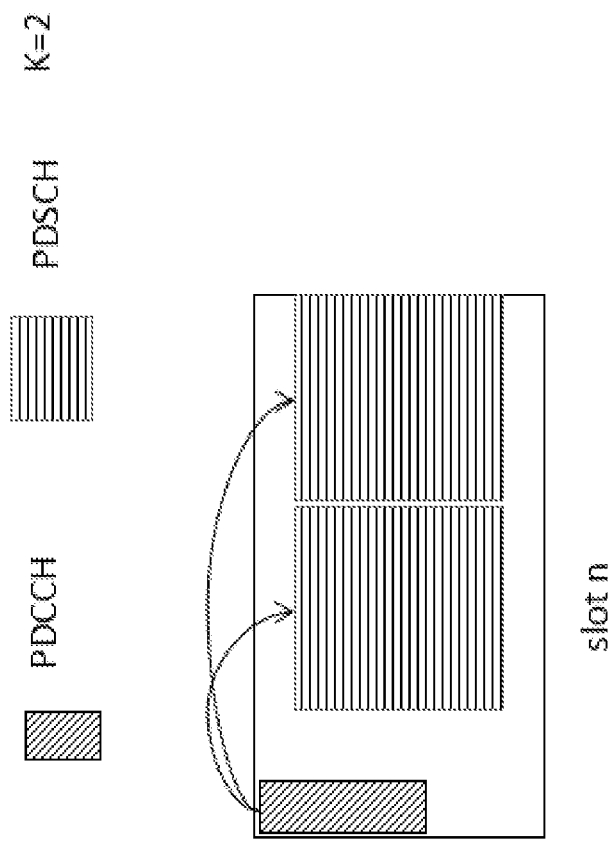
FIG. 11 shows an example of an intra-slot schedule based on some implementations of the disclosed technology.

Multiple PDSCH repetition can also be supported within one slot. FIG. 11 shows an example for an intra-slot schedule. As shown in FIG. 11, each PDSCH may only be mapped on few OFDM symbols. Furthermore, inter-slot PDSCH repetition can be combined, i.e. one single PDCCH schedules K PDSCH repetitions across multiple slots wherein one slot may include more than one PDSCH repetition.

In order to achieve beam diversity gain, multiple TCI states can be indicated by PDCCH for the multiple PDSCH scheduling. This multiple slot scheduling for the same TB transmission is denoted as TDM repetition. The number of PDSCH occasion in the time domain scheduled by the single PDCCH is denoted as K. Since K repetitions are not mapped on the overlapping resources, the same DMRS port(s) can be indicated for the K repetitions. The number of K can be configured by a RRC (Radio Resource Control) signaling to the UE. In some implementations, K can be implicitly or explicitly indicated by a DCI. In this case, K transmissions of data corresponds to K repetitions which are mapped on K non-overlapping time domain occasions.

Since the SDM repetition and the FDM repetition are supported in the same OFDM symbols or the same slot, each of the SDM repetition and the FDM repetition can be combined with the TDM repetition. In this case, the total number of repetitions including in spatial domain, or frequency domain, or time domain may be greater than K. For instance, total 2K repetitions are received by UE if two FDM repetitions and K TDM repetitions are used.

In order to achieve most flexibility, those repetition schemes are dynamically informed to UE. In some implementations, the number of the actual repetitions may be dynamically changed which depends on the value K and based on a repetition mode, for example, whether the SDM repetition and/or the FDM repetition is used. Denoting the number of TCI states or QCL RS sets indicated by the TCI codepoint in DCI as N. To reduce standard effort and signaling overhead, the candidates of value N may be limited, e.g. 1 or 2. If the number of total repetitions does not match N, the mapping between N indicated TCI states or N QCL RS sets and transmissions of data may be informed to the UE. In some implementations, the repetition mode may also be informed to the UE.

To inform the UE i) the repetition mode and ii) the mapping between the N indicated TCI states and the transmissions of data, some rules or signaling may need to be defined. Some implementations for the techniques to inform the UE are based on the DMRS port indication ('Antenna port(s)' field in DCI), N indicated TCI states, and value K.

In some implementations, if two same TCI states or QCL RS sets are indicated, N can also be assumed as 1. In other words, N TCI states or QCL RS sets mean N different TCI states or QCL RS sets.

Example 1

Assuming that indicated N=2 or 4, e.g., N=2, TCI states as TCI 0 and TCI 1, time domain repetition factor K=4 is configured by the higher layer. Since Rel-15 multi-slot scheduling supports rank 1 transmission, we assume the rank 1 transmission from one TRP. One time domain transmission including one or more repetition can also be assumed as one time domain occasion.

Since K>1, the time domain repetition is adopted.

In the below, an example of a DMRS indication table, Table 1, is shown. In Table 1, it is assumed that dmrs-Type=1 and maxLength=2. In Table 1, the TDM repetition may be selected as shown in rows with values 0 to 3, the SDM repetition may be selected as shown in rows with values 4 and 5, and the FDM repetition may be selected as shown in rows with value 6 to 9. In one slot, multiple TRP transmission or single TRP transmission can be dynamically changed based on various channel conditions.

TABLE 1

DMRS indication table assuming dmrs-Type = 1, maxLength = 2
One MCS field

| Value | Number of DMRS CDM group(s) without data | DMRS port(s) | Number of front-load symbols | Corresponding TCI index within indicated TCI states |
|---|---|---|---|---|
| 0 | 1 | 0 | 1 | $i = \left\lfloor \frac{k}{M} \right\rfloor$ or |
| 1 | 2 | 0 | 1 | |
| 2 | 1 | 0 | 2 | $i = k \bmod N$ |
| 3 | 2 | 0 | 2 | |
| 4 | 2 | 0; 2 | 1 | $i = 2\left\lfloor \frac{k}{2M} \right\rfloor; i+1 = 2\left\lfloor \frac{k}{2M} \right\rfloor + 1$ or |
| 5 | 2 | 0; 2 | 2 | $i = 2k \bmod N; i = (2k+1) \bmod N$ |
| 6 | 1 | 0 | 1 | $i = 2\left\lfloor \frac{k}{2M} \right\rfloor; i+1 = 2\left\lfloor \frac{k}{2M} \right\rfloor + 1$ or |
| 7 | 2 | 0 | 1 | |
| 8 | 1 | 0 | 2 | $i = 2k \bmod N; i+1 = (2k+1) \bmod N$ |
| 9 | 2 | 0 | 2 | |
| 10-31 | Reserved | Reserved | Reserved | Reserved |

The TDM repetition may be dynamically selected as shown in rows with value 0 to 3 in Table 1. In this case, a single TRP transmission is used and there is only one repetition in one time domain occasion. In this case, only one DMRS port is enough because of the single layer and the single TRP transmission. Therefore, one TCI is for one slot. The TCI states for four time domain repetitions can include TCI 0, TCI 0, TCI 1, TCI 1, respectively. In general, N TCI states are used for K time domain repetitions. TCI index i within the indicated TCI states for slot k can be determined by Equation 1:

$$i = \left\lfloor \frac{k}{M} \right\rfloor, \text{ wherein } M = K/N. \quad \text{Equation 1}$$

In other words, K repetitions are divided into N blocks, each block including M consecutive repetitions, and N TCI states are used for N blocks in order. Alternatively, the TCI states for four time domain repetitions can include TCI 0, TCI1, TCI 0, TCI 1. respectively. In general, TCI index i within the indicated TCI states for slot k can be determined by Equation 2:

$$i = k \bmod N \quad \text{Equation 2}$$

N TCI states are used for N consecutive repetitions and cycling. Even if more than 1 DMRS ports are allocated, all DMRS ports correspond to the same TCI in one slot.

The FDM repetition including the FDM repetition only (if K=1) and a combined repetition of the TDM and FDM repetition, i.e. the TDM+FDM repetition mode, may be selected as shown in rows with value 6 to 9 in Table 1 (if K>1). If FDM is used, then two TCI states are needed in one slot for the two frequency resource parts. The indicated four TCI states for four time domain occasions can include (TCI 0, TCI 1), (TCI 0, TCI 1), (TCI 2, TCI 3), (TCI 2, TCI 3), respectively. In this case, total 2K transmissions or repetitions are scheduled. In each time domain occasion, two repetitions based on the FDM are used. In general, the indicated TCI states for slot k can be indicated by Equation 3:

$$\left( i = 2\left\lfloor \frac{k}{2M} \right\rfloor, i+1 = 2\left\lfloor \frac{k}{2M} \right\rfloor + 1 \right) \quad \text{Equation 3}$$

In Equation 3, TCI i and i+1 for the first frequency resource part and the second frequency resource part respectability which respectively correspond to the first repetition and the second repetition in time domain occasion k.

K occasions are divided into N/2 blocks, each N/2 block including 2M time domain occasions. N TCI states are divided into N/2 groups, two consecutive TCI states are one group. N/2 TCI groups are used for N/2 blocks in order. Within each time domain occasion, the first TCI is for the first frequency resource part and the second TCI is for the second frequency resource part. Alternatively, the indicated four TCI states for four time domain occasions can include (TCI 0, TCI 1), (TCI 2, TCI 3), (TCI 0, TCI1), (TCI 2, TCI 3), respectively. In general, the indicated TCI states for slot k can be indicated by Equation 4:

$$(i=2k \bmod N, i+1=(2k+1)\bmod N). \quad \text{Equation 4}$$

N TCI states are divided into N/2 groups, two consecutive TCI states are one group. N/2 TCI groups are used for K occasions and cycling.

Since two TRPs transmit data on non-overlapping resource parts, the same DMRS ports can be used for the two frequency parts.

The SDM repetition including the SDM repetition only (if K=1) and a combined repetition between SDM and TDM repetition, i.e. SDM+TDM may be selected as shown in rows with values 4 and 5 in Table 1 (if K>1). If SDM is used, then two TCI states are needed in one time domain occasion for the two DMRS port groups. To avoid serous interference between two TRPs, DMRS ports from the two TRPs may be mapped on different CDM groups, as shown in rows with value 4 and 5 in Table 1. The indicated four TCI states for 4 time domain occasions can include (TCI 0, TCI 1), (TCI 0, TCI 1), (TCI 2, TCI 3), (TCI 2, TCI 3), respectively. In this case, total 2K transmissions or repetitions are scheduled. In each time domain occasion, two repetitions based on SDM are used. In general, the indicated TCI states for slot k can be indicated by Equation 5:

$$\left( i = 2\left\lfloor \frac{k}{2M} \right\rfloor, i+1 = 2\left\lfloor \frac{k}{2M} \right\rfloor + 1 \right) \quad \text{Equation 5}$$

In Equation 5, TCI i is for the DMRS ports within the first allocated CDM group and TCI i+1 is for the DMRS ports in the remaining CDM group(s), vice versa. Thus, K repetitions are divided into N/2 blocks, each N/2 block including 2M time domain occasions. N TCI states are divided into N/2 groups and two consecutive TCI states are one group. N/2 TCI groups are used for N/2 blocks in order. Within each time domain occasion, the first TCI is for the DMRS ports within the first allocated CDM group and the second TCI is for the DMRS ports in the remaining CDM group(s).

Alternatively, the indicated four TCI states for four time domain occasions can be (TCI 0, TCI1), (TCI 2, TCI3), (TCI 0, TCI1), (TCI 2, TCI3), respectively, as same as FDM case. Since two TRPs transmit data on overlapping resources, multiple DMRS ports from two TRPs map on different CDM groups should be allocated to UE for SDM repetition.

When one single PDCCH schedules K time domain occasions, and N TCI states are indicated by the PDCCH, the DMRS port indication may be used to distinguish the specific repetition scheme or mode. As shown in Table 1, although the value 0 and value 6 informs the same DMRS port information, the value 0 and value 6 indicate the TDM repetition mode and the combined mode of the FDM repetition and the TDM repetition, respectively, in the same time domain occasion. If multiple DMRS ports are allocated and mapped on multiple CDM groups, the repetition scheme is based on the combined mode of the SDM repetition and the TDM repetition. In some implementations, the DMRS port indication is also used to indicate the mapping between N indicated TCI states and the scheduling repetitions. In some implementations, the DMRS port indication is also used to indicate the mapping between N indicated TCI states and indicated DMRS port(s) for SDM, or between N indicated TCI states and frequency parts for FDM, or between N indicated TCI states and time domain occasions for TDM.

Based on K, N and the DMRS port indication, the repetition mode, the mapping between N indicated TCI states and the scheduling repetitions can be achieved. As shown in Table 1 above, some entries carry the same DMRS port information with different repetition modes. In some implementations, some entries can carry the same DMRS port information with different mapping relationships between the indicated TCI states and the scheduling repetitions. In some implementations, some entries can carry the same DMRS port information with different mapping relationships between the indicated TCI states and DMRS ports. In some implementations, some entries can carry the same DMRS port information with different mapping relationships between the indicated TCI states and frequency resource parts. Consequently, it can be regarded as a joint encoding among DMRS port information, repetition modes and the mapping relationship.

In Table 1, if K>1 and N>1, then entries with values 0 to 3 correspond to repetition mode TDM only. In one-time domain PDSCH occasion of the TDM repetition mode, all DMRS ports and all frequency resources correspond to one TCI state. In Table 1 above, entries with values 4 and 5 correspond to the combined mode of the SDM repetition and the TDM repetition, i.e., SDM+TDM repetition mode. In one-time domain PDSCH occasion of the SDM+TDM repetition mode, the DMRS ports within one allocated CDM group correspond to one TCI state, other DMRS ports correspond to another TCI state, e.g. the DMRS ports within the first or last allocated CDM group correspond to one TCI state, other DMRS ports correspond to another TCI state. PDSCH streams or layers corresponding to the first TCI state and other PDSCH streams or layers corresponding to the second TCI state carry a same TB. In other words, the two layer groups are SDM repetitions on the completely overlapping resources. Entries with value 6-9 correspond to the combined mode of the FDM repetition and the TDM repetition, i.e., FDM+TDM repetition mode. Two TCI states are used for frequency resource part 1 and 2, respectively. The DMRS ports are same for the two frequency resource parts 1 and 2. Since maybe only one MCS field is configured in DCI, two frequency resource parts can be predefined with the same number of PRBs, e.g. the allocated PRBs are equally divided into two frequency resource parts 1 and 2, and the same MCS.

As shown in Table 1 above, following TCI mapping patterns are mentioned:

$$i = \left\lfloor \frac{k}{M} \right\rfloor \qquad \text{i)}$$

for TDM repetition only ii) $i = k \bmod N$ for TDM repetition only $$\left( i = 2\left\lfloor \frac{k}{2M} \right\rfloor; i+1 = 2\left\lfloor \frac{k}{2M} \right\rfloor + 1 \right) \qquad \text{iii)}$$

for the combined SDM+TDM repetition or the combined FDM+TDM repetition;

iv) ($i = 2k \bmod N$; $i+1 = (2k+1) \bmod N$) for the combined SDM+TDM repetition or the combined FDM+TDM repetition.

Since there are still many reserved entries in the DMRS table, TCI mapping pattern can also be indicated by DMRS port indication, e.g., joint encoding between DMRS port information and TCI mapping pattern. Table 1 is an example with one layer limitation per each TRP and various modifications can be applied to the DMRS indication table. In addition, as it is not flexible if the number of time domain occasions is only semi-statically indicated, some parameters related K, e.g. the number of time domain occasions within one slot, or the value of K can also be indicated by DMRS port indication or by some bits of DMRS port indication field in DCI since there are many reserved entries.

Example 2

Compared with Table 1, the layer limitation per each TRP can be removed in Table 2 as shown below.

TABLE 2

DMRS indication table assuming dmrs-Type = 1, maxLength = 2

One MCS field

| Value | Number of DMRS CDM group(s) without data | DMRS port(s) | Number of front-load symbols | Corresponding TCI index within indicated TCI states | Repetition mode |
|---|---|---|---|---|---|
| 0 | 2 | 0 | 1 | $i = \left\lfloor \frac{k}{M} \right\rfloor$ or $i = k \bmod N$ | TDM only |
| 1 | 2 | 0 | 2 | | |
| 2 | 2 | 0, 1 | 1 | | |
| 3 | 2 | 0, 1 | 2 | | |
| 4 | 2 | 0, 1, 2 | 1 | | |
| 5 | 2 | 0, 1, 4 | 2 | | |
| 6 | 2 | 0, 1, 2, 3 | 1 | | |
| 7 | 2 | 0, 1, 4, 5 | 2 | | |
| 8 | 2 | 0, 2 | 1 | | |
| 9 | 2 | 0, 2 | 1 | $i = 2\left\lfloor \frac{k}{2M} \right\rfloor; i+1 = 2\left\lfloor \frac{k}{2M} \right\rfloor + 1$ or $i = 2k \bmod N; i = (2k+1) \bmod N$ | SDM + TDM |
| 10 | 2 | 0, 2 | 2 | | |
| 11 | 2 | 0, 1, 2, 3 | 1 | | |
| 12 | 2 | 0 | 1 | $i = 2\left\lfloor \frac{k}{2M} \right\rfloor; i+1 = 2\left\lfloor \frac{k}{2M} \right\rfloor + 1$ or $i = 2k \bmod N; i = (2k+1) \bmod N$ | FDM + TDM |
| 13 | 2 | 0 | 2 | | |
| 14 | 2 | 0, 1 | 1 | | |
| 15 | 2 | 0, 1 | 2 | | |
| 16 | 2 | 0, 1, 2 | 1 | | |
| 17 | 2 | 0, 1, 4 | 2 | | |

TABLE 2-continued

| | | DMRS indication table assuming dmrs-Type = 1, maxLength = 2 | |
|---|---|---|---|
| 18 | 2 | 0, 1, 2, 3 | 1 |
| 19 | 2 | 0, 1, 4, 5 | 2 |
| 20 | 2 | 0, 2 | 1 |

| | | | One MCS field | | |
|---|---|---|---|---|---|
| Value | Number of DMRS CDM group(s) without data | Value | Number of DMRS CDM group(s) without data | Value | Number of DMRS CDM group(s) without data |
| 21-31 | Reserved | Reserved | Reserved | Reserved | |

If K>1 and N>1, then entries with values 0 to 8 correspond to the TDM repetition mode only. In one-time domain PDSCH occasion of the TDM repetition mode only, all DMRS ports and all frequency resources only correspond to one TCI state.

Entries with values 9 to 11 correspond to the combined SDM+TDM repetition mode. In one-time domain PDSCH occasion of the combined SDM+TDM repetition mode, the DMRS ports within one CDM group correspond to one TCI state, other DMRS ports correspond to another TCI state. PDSCH streams or layers corresponding to first TCI state and other PDSCH streams or layers corresponding to second TCI state carry a same TB. In other words, the two layer groups are SDM repetitions on the completely overlapping resources. Comparing entries with values 8 and 9 to each other, the entries with values 8 and 9 carry a same DMRS port information but represent different repetition mode and the mapping relationship.

Entries with values 12 to 20 correspond to the combined FDM+TDM repetition mode. Two TCI states are used for frequency resource parts 1 and 2, respectively. The same DMRS ports are same for the two frequency resource parts 1 and 2. Comparing entries with value x and value x+12 (x=0 to 8) to each other, the entries carry the same DMRS port information but represent different repetition mode and the mapping relationship.

The implementations 1 and 2 have been discussed with the assumption that the FDM repetition mode, the TDM repetition mode, the SDM repetition mode, the combined repetition modes are supported. However, it is also possible that only some of the repetition modes are supported. For instance, only three modes, e.g., the TDM repetition mode, the SDM repetition mode, and the combined TDM+SDM repetition mode can be supported. In this case, some entries for indicating FDM or FDM+TDM in Tables can become unnecessary. In some implementations, an additional repetition mode can be supported. In this case, two TCI states are used for the same DMRS port(s). For example, two TRPs transmit a same TB with different beams or different TCI states but on the same DMRS port(s).

Implementation 2

If K=1, or the repetition factor or the number of occasions in the time domain is not configured by a RRC signaling, TDM repetition mode will not be used. In this case, the repetition modes may include FDM repetition and SDM repetition. Alternatively, the repetition mode can also include a non-repetition, i.e. a single TRP transmission or transmission without repetition or transmission without SDM, FDM and TDM or it can be assumed as only one repetition for the data transmission. For the non-repetition mode, all DMRS ports and all allocated frequency resources correspond to the same TCI state. If N TCI states are configured wherein N is greater than 1, for the non-repetition mode, the first one of N TCI states may be used. In Table 3 as shown below, N is assumed as two.

TABLE 3

| | DMRS indication table assuming dmrs-Type = 1, maxLength = 2 | | | |
|---|---|---|---|---|
| | One MCS field | | | |
| Value | Number of DMRS CDM group(s) without data | DMRS port(s) | Number of front-load symbols | Corresponding TCI index within indicated TCI states |
| 0 | 2 | 0 | 1 | The first TCI state |
| 1 | 2 | 0 | 2 | |
| 2 | 2 | 0, 1 | 1 | |
| 3 | 2 | 0, 1 | 2 | |
| 4 | 2 | 0, 1, 2 | 1 | |
| 5 | 2 | 0, 1, 4 | 2 | |
| 6 | 2 | 0, 1, 2, 3 | 1 | |
| 7 | 2 | 0, 1, 4, 5 | 2 | |
| 8 | 2 | 0, 2 | 1 | |
| 9 | 2 | 0, 2 | 1 | The first TCI sate is for DMRS port(s) in the first CDM group; |
| 10 | 2 | 0, 2 | 2 | |
| 11 | 2 | 0, 1, 2, 3 | 1 | The second TCI state is for DMRS port(s) in other CDM groups |

TABLE 3-continued

DMRS indication table assuming dmrs-Type = 1, maxLength = 2

One MCS field

| Value | Number of DMRS CDM group(s) without data | DMRS port(s) | Number of front-load symbols | Corresponding TCI index within indicated TCI states |
|---|---|---|---|---|
| 12 | 2 | 0 | 1 | The first TCI sate is for the first frequency resource part; |
| 13 | 2 | 0 | 2 | The second TCI sate is for the second frequency resource part; |
| 14 | 2 | 0, 1 | 1 | |
| 15 | 2 | 0, 1 | 2 | |
| 16 | 2 | 0, 1, 2 | 1 | |
| 17 | 2 | 0, 1, 4 | 2 | |
| 18 | 2 | 0, 1, 2, 3 | 1 | |
| 19 | 2 | 0, 1, 4, 5 | 2 | |
| 20 | 2 | 0, 2 | 1 | |
| 21-31 | Reserved | Reserved | Reserved | Reserved |

Implementation 3

The implementations above are based on the assumption of N>1, i.e. there are multiple TCI states are indicated by a TCI codepoint in DCI. However, a case of N=1 also needs to be supported. Basically, N=1 corresponds to a single TRP transmission which is supported in Rel-15. N is always 1 in Rel-15 for both single slot scheduling and multiple slot scheduling.

In this implementation, separate DMRS port indication tables may be used for cases with different N values. Specifically, the legacy DMRS port indication table can be reused when N=1, but a new DMRS table can be used when N>1. Once the sizes of two DMRS tables are the same as each other, the DCI format can be kept as the same as Rel-15. The necessary entries in the DMRS table for a case of N>1 are much less than that of a case of N=1. That's because N>1 is usually configured for power limited UEs and MU-scheduling is unnecessary in this case. Then the DMRS table size can be much smaller than the legacy table. Table 4 shows an example of a DMRS indication table assuming dmrs-Type=1, maxLength=2. As shown in Table 4, total 8 entries with 3 bits are enough for indicating DMRS port information when N>1. Compared to the legacy table 5 bits, 2 bits can be saved if the information of repetition mode and the mapping between TCI states, DMRS ports, and frequency resources is not considered. Since N can be changed dynamically between N>1 and N=1, the DCI size may need to be the same for both cases of N>1 and N=1. Therefore, the remaining DMRS port indication bits can be used to inform repetition mode and the mapping between TCI states and repetitions.

TABLE 4

DMRS indication table assuming dmrs-Type = 1, maxLength = 2

| $rv_{id}$ indicated by the DCI schedul- | $rv_{id}$ to be applied to $k^{th}$ transmission occasion in time domain | | | |
|---|---|---|---|---|
| ing the PDSCH | k mod 4 = 0 | k mod 4 = 1 | k mod 4 = 2 | k mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

When N=1, the DMRS port indication field is only to indicate DMRS port information same as in Rel-15. When N>1, some bits of the DMRS port indication field indicate the repetition mode, TCI mapping pattern, and the mapping between TCI states, DMRS ports and frequency resources. The remaining bits can still be used to indicate DMRS port indication. Alternatively, the joint encoding among the DMRS port indication, the repetition mode, and the mapping relationship can be used when N>1 as described in Implementation 1.

Implementation 4

As for multiple occasion PDSCH scheduling in time domain as shown in FIG. 10, if only one TCI state is indicated, a redundancy version (RV) to be applied on the kth transmission occasion of the TB is determined based on Table 5. This mechanism is the same as Rel-15. In other words, the RV relationship between the first and the subsequent PDSCH occasions are is predefined. RV ID of the first occasion is indicated by RV field in DCI.

TABLE 5

Applied redundancy version when K > 1

| $rv_{id}$ indicated by the DCI schedul- | $rv_{id}$ to be applied to $k^{th}$ transmission occasion in time domain | | | |
|---|---|---|---|---|
| ing the PDSCH | k mod 4 = 0 | k mod 4 = 1 | k mod 4 = 2 | k mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 12:
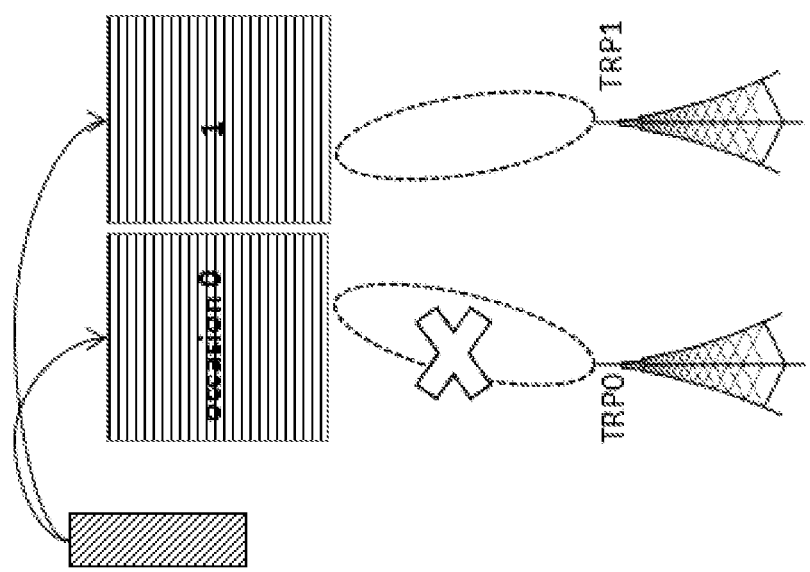
FIG. 12 shows an example diagram of a multiple TRP transmission with a TDM (Time Division Multiplexing) repetition mode based on some implementations of the disclosed technology.

If the multiple TRP transmission is supported, a new approach may be needed instead of the mechanism above. FIG. 12 shows an example diagram of a multiple TRP transmission with a TDM repetition mode. In FIG. 12, N is greater than 1. In FIG. 12, it is assumed that TCI state 0 and TCI state 1 are used for the PDSCH occasion 0 and the PDSCH occasion 1, respectively. If rvid indicated by the DCI is equal to 0, then the actual rvid for the two occasions are 0, 2 respectively. based on Table 5. In a high frequency band, one of transmission paths, e.g., a link between the UE and TRP 0, can be blocked by, for example, a human body. In this case, the second occasion can still be received by the UE based on TCI state 1. However, the rvid of PDSCH occasion 1 is 2 at this time, and the UE may not be able to correctly detect the PDSCH based on rvid=2 because only rvid=0 and 3 are self-decidable. In this case, some implementations suggest to inform the UE rvid=0 or 3 for the second occasion. However, the explicit indication will lead to larger DCI overhead.

Basically, one TCI state can correspond to one TRP or one beam transmission. Therefore, the predefined relationship in Table 5 can still be reused for repetitions with the same TCI state. In some implementations, some new predefined relationship among the first rvid of each TCI state can be defined.

In some implementations, all scheduled PDSCH repetitions can be divided into N groups and PDSCH repetitions within a group are associated with a same TCI state. The rvid indicated by the DCI is for one of e.g. the first repetition of the first group. A new predefined relationship is set up among the rvid of first repetition of the first group and the rvid of first repetition of the other groups. Generally, a new predefined relationship is set up among the rvid of one repetition of the first group and the rvid of one repetition of the other groups.

Within each group, the repetition order is ascending in time domain. In other words, for the PDSCH repetitions with the same TCI state, the PDSCH repetition index i occurs before than the index i+1. Regarding the groups, the group order is ascending in frequency domain first, and then in time domain for the FDM repetition mode. For the SDM repetition mode, two repetition groups are mapped on different DMRS CDM groups, i.e. the group order is ascending in spatial domain first, and then in time domain.

One new predefined relationship is described in Table 6. If rvid indicated by DCI is 0, the rvid for the first repetition in the first group is 0, and the rvid for the first repetition in the second group is 3. If rvid indicated by DCI is 3, the rvid for the first repetition in the first group is 3, and the rvid for the first repetition in the second group is 0. If rvid indicated by DCI is 2, the rvid for the first repetition in the first group is 2, and the rvid for the first repetition in the second group is 1. If rvid indicated by DCI is 1, the rvid for the first repetition in the first group is 1, and the rvid for the first repetition in the second group is 2. Alternatively, a same value can be used among the rvid of first repetition of the first group and the rvid of first repetition of the other groups

TABLE 6

Applied redundancy version for the first repetition of all groups

| $rv_{id}$ indicated by the DCI scheduling the PDSCH | $rv_{id}$ to be applied to the first repetition of $g^{th}$ group | |
|---|---|---|
| | g mod 2 = 0 | g mod 2 = 1 |
| 0 | 0 | 3 |
| 2 | 2 | 1 |
| 3 | 3 | 0 |
| 1 | 1 | 2 |

Figure 13:
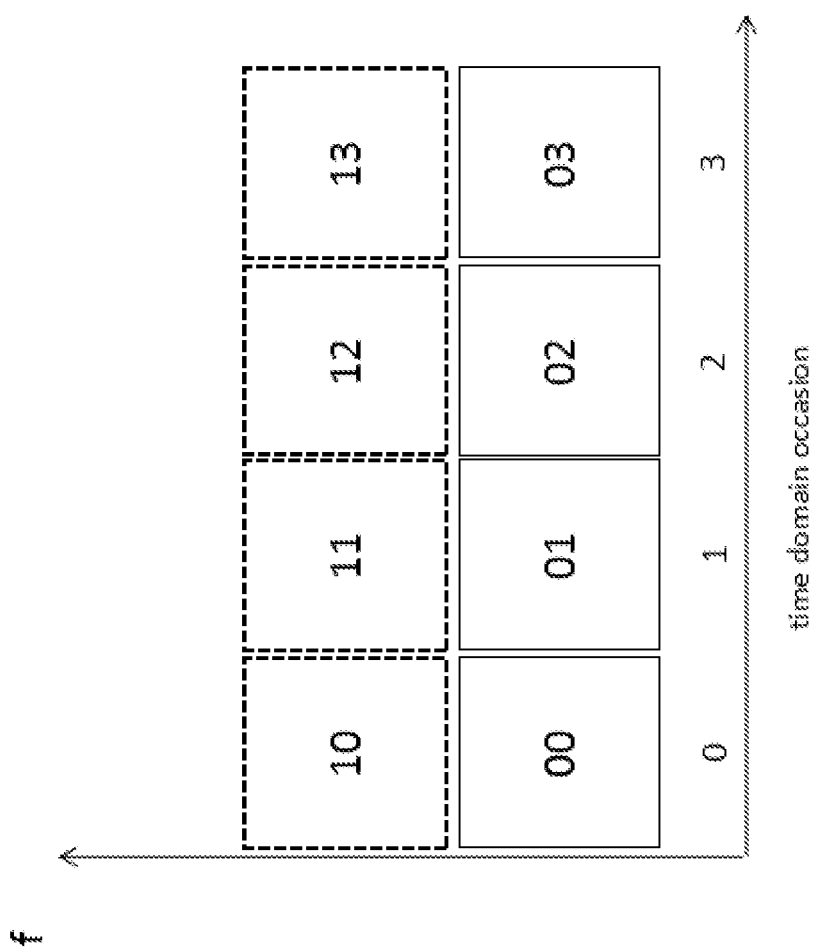
FIG. 13 shows an example of a diagram to divide scheduled PDSCH (Physical Data Shared Channel) repetitions based on some implementations of the disclosed technology.

FIG. 13 shows an example of a diagram to divide scheduled PDSCH repetitions. In FIG. 13, the combined FDM+TDM repetition mode is indicated. The combined FDM+TDM repetition mode is assumed as same as that described in Implementation 1 and thus, N=2 and K=4. Then all eight repetitions are divided into two groups, repetition 00, 01, 02 and 03 use TCI state 0 within group 0, repetition 10, 11, 12 and 13 use TCI state 1 within group 1. The detailed rvid is shown in Tables 7 and 8. For the combined SDM+TDM repetition mode, the two groups correspond to different CDM groups.

TABLE 7

Applied redundancy version for the first group

| $rv_{id}$ indicated by the DCI | $rv_{id}$ to be applied to each repetition | | | |
|---|---|---|---|---|
| scheduling the PDSCH | Repetition 00 | Repetition 01 | Repetition 02 | Repetition 03 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TABLE 8

Applied redundancy version for the second group

| $rv_{id}$ indicated by the DCI | $rv_{id}$ to be applied to each repetition | | | |
|---|---|---|---|---|
| scheduling the PDSCH | Repetition 10 | Repetition 11 | Repetition 12 | Repetition 13 |
| 0 | 3 | 1 | 0 | 2 |
| 2 | 1 | 0 | 2 | 3 |
| 3 | 0 | 2 | 3 | 1 |
| 1 | 2 | 3 | 1 | 0 |

Above group-based RV rules can work well in the high frequency band. In the low frequency band, only one group is enough since there is no blockage issue. In this case, the repetition order is ascending in spatial domain or frequency domain first, and then in time domain. The rule can be based on Table 5 with modification of k which is the repetition index within all repetitions including all domains. Thus, only one group or no group-based RV rule is used in low frequency band.

Therefore, some implementations introduce one RRC signaling to turn on or turn off the group-based solution. In this case, the RRC signaling is to switch between only one group and N groups. In some implementations, whether to be one group or N groups depends on the frequency bands. In FR1 (frequency range 1, i.e. sub-6 GHz), one group is used. In FR2, N group is used.

Implementation 5

In a current DCI, there is only one 'frequency domain resource assignment' field in the DCI in order to indicate or inform the UE the frequency resources, e.g. which PRBs or RBGs are allocated. If the FDM repetition mode in indicated, two TCI states are used for two frequency resource parts as described above. One approach to inform the UE the two frequency resource parts may be to add one more 'frequency domain resource assignment' field in the DCI. In this case, two fields indicate two frequency resource parts respectively, which will lead to increase the DCI size and cause less PDCCH capacity.

Another approach to inform the UE the two frequency resource parts may be to predefine the relationship between the frequency resource parts. Since the same TB is transmitted twice in the two frequency resource parts, i.e. TBS is the same in the two parts, the two frequency resource parts can be assumed with the same number of PRBs or RBGs. MCS can also be assumed the same. In this case, the same TBS can be guaranteed. For instance, X RBGs or PRBs are allocated to the UE by the 'frequency domain resource assignment' field in the DCI, then the first X/2 RBGs or PRBs are allocated for the first frequency resource part, and the remaining RBGs or PRBs are for the second frequency resource part. This approach can make a simpler UE implementation especially when only one MCS field is configured in the DCI. If X/2 is not integer, $$\left\lfloor \frac{X}{2} \right\rfloor \text{ or } \left\lceil \frac{X}{2} \right\rceil$$

RBGs or PRBs are allocated for the first frequency resource part, and the remaining RBGs or PRBs are for the second frequency resource part.

Since the same number of RBGs and the same MCS value need to be assumed, the transmission efficiency is not high in the case when channel conditions from two TRPs are very different. If SINR between TRP 0 and the UE is much higher than that between TRP 1 to UE, gNB can allocate less PRBs or RBGs for the first frequency resource part than the second frequency resource part. This is because less PRBs are needed to carry the same TB for the first frequency resource part.

Therefore, different MCS values can be considered for the two frequency resource parts. Two MCS fields can be configured in DCI. In some implementations, the two MCS fields can be used for the two frequency resource parts. Since larger MCS value means higher channel SINR, the larger MCS value is indicated, the less PRBs or RBGs can be assumed. In some implementations, the number of PRB or RBGs for each of the frequency resource parts is based on the indicated MCS. For instance, the number of RBGs or PRBs for the first frequency resource part can be obtained by Equation 6:

$$X_1 = \left\lfloor X \cdot \frac{R^2 \cdot Q^2 \cdot v^2}{R^1 \cdot Q^1 \cdot v^1 + R^2 \cdot Q^2 \cdot v^2} \right\rfloor \text{ or } X_1 = \left\lceil X \cdot \frac{R^2 \cdot Q^2 \cdot v^2}{R^1 \cdot Q^1 \cdot v^1 + R^2 \cdot Q^2 \cdot v^2} \right\rceil \quad \text{Equation 6}$$

In Equation 6 above, $R^1$, $Q^1$ and $v^1$ represent a code rate, a modulation order, and the number of DMRS ports for the first frequency resource part, respectively, and $R^2$, $Q^2$ and $v^2$ represent a code rate, a modulation order, and the number of DMRS ports for the second frequency resource part. The code rate and the modulation order are based on indicated MCS. The number of DMRS ports can be assumed the same for the two frequency resource parts or indicated by DMRS port indication field in the DCI. Therefore, $X_2 = X - X_1$.

As shown in Table 9, entries with values 0 to 3 are the same as the legacy ones when two MCS fields exist in the DCI and both two CWs are enabled. In this case, more entries, e.g. entries with values 4 to 7 are added to indicate the repetition mode.

TABLE 9

DMRS indication table assuming dmrs-Type = 1, maxLength = 2 for two MCS cases

Two MCS fields are enabled

| Value | Number of DMRS CDM group(s) without data | DMRS port(s) | Number of front-load symbols | Repetition mode |
|---|---|---|---|---|
| 0 | 2 | 0-4 | 2 | Single TRP transmission, |
| 1 | 2 | 0, 1, 2, 3, 4, 6 | 2 | |

TABLE 9-continued

DMRS indication table assuming dmrs-Type = 1, maxLength = 2 for two MCS cases

Two MCS fields are enabled

| Value | Number of DMRS CDM group(s) without data | DMRS port(s) | Number of front-load symbols | Repetition mode |
|---|---|---|---|---|
| 2 | 2 | 0, 1, 2, 3, 4, 5, 6 | 2 | i.e. no |
| 3 | 2 | 0, 1, 2, 3, 4, 5, 6, 7 | 2 | repetition |
| 4 | 2 | 0 | 1 | FDM |
| 5 | 2 | 0 | 2 | repetition |
| 6 | 2 | 0, 2 | 1 | |
| 7 | 2 | 0, 2 | 2 | |
| 8-31 | reserved | reserved | reserved | reserved |

Implementation 6

NR Rel-15 supports multiple slot scheduling as shown in FIG. 10, and the same symbol allocation is applied across the pdsch-AggregationFactor (it can be denoted as K1) consecutive slots. The pdsch-AggregationFactor is configured by RRC signaling. Intra-slot multiple PDSCH repetition as shown in FIG. 11 is not supported in Rel-15.

The PDSCH mapping has two types which are mapping type A and type B respectively. For the mapping type A, the first DMRS of the PDSCH may be symbol 2 or 3 of one slot and then intra-slot multiple PDSCH repetition may not work well since each repetition needs its DMRS in a case that TCI states are different. For the mapping type B, another intra-slot aggregation factor (it can be denoted as K2) can be introduced, and the value can be greater than 1. Then, the total K across intra or inter slots are K1*K2. Within one slot, K2 repetitions need to be consecutive for simplicity. In different slots, PDSCH locations are the same for each slot. In brief, two repetition factors are supported, one is the number inter-slot repetition as Rel-15, the other is number of intra-slot repetitions.

RRC signaling can be used to configure the number of K2, but the actual number needs to be based on available OFDM symbols within each slot. Within one slot, after one PDSCH repetition, if there is no enough available OFDM symbols for the next repetition (the total number of repetitions within the slot need not be greater than K), the next repetition will not be transmitted.

Implementation 7

The FDM repetition mode and the SDM repetition mode are introduced above. In the FDM repetition mode, two TRPs transmit two parts of data in two non-overlapping frequency parts. In the SDM repetition mode, two TRPs transmit two parts of data in complete overlapping resource. It is noted that two parts of data can be different if the repetition is not used.

There is another scheme for multi-TRP transmission, i.e. partial overlapping. In other words, two TRP transmit two parts of data in partial overlapping resources. In this case, UE complexity is very high since the behavior to detect interference in non-overlapping part and overlapping part may be different.

If UE has no enough ability to support two behaviors for its interference detection, it is better for TRPs not to schedule partial overlapping resources to the UE. Therefore, the UE can report its capability to indicate gNB whether it supports partial overlapping resource scheduling. It is noted that two resources can be scheduled by two PDCCHs. Then, the UE may report its capability to indicate gNB whether it supports partial overlapping resources scheduled by two PDCCHs.

For the SDM transmission, two TCI states corresponding to two TRPs can be used for the same DMRS port(s) but with different DMRS sequences, e.g. the same orthogonal DMRS port(s) but with different nSCID. Although DMRS from two TRPs are not orthogonal, some UEs with higher capability can still correctly detect the DMRS, for example, depending on UE capability. Therefore, the UE can report its capability to indicate gNB whether it supports two TCI corresponding to the same DMRS port(s). The UE can report its capability to indicate gNB whether it supports two TCI corresponding to the same DMRS port(s) but with different DMRS sequences.

Implementation 8

Above examples are only for a downlink (DL). Various implementations of the disclosed technology can also be used for the uplink (UL) multiple panel transmission. The UE may have two panels, and the same TB can also be transmitted from the two panels.

In the UL, the beam information is indicated by a parameter of spatial relation information or SRS resource or SRS resource set instead of TCI state. If the implementations as discussed above are used for the UL, N is the number of the RS in spatial relation information, or the number of spatial relation information, or the number of indicated SRS resources, or the number of indicated SRS resource sets. It is noted that the SRS resource(s) or resource set(s) are usually indicated by SRI(s) in DCI.

In some implementations, N=1 and N>1 correspond to different DMRS port indication tables. K=1 and K>1 can also correspond to different DMRS tables when N>1. So total three DMRS tables can be supported.

FIG. 14 shows an example of a flowchart of a multiple transmission scheme based on some implementations of the disclosed technology. As shown in FIG. 14, the example of the multiple transmission scheme includes transmitting, by a first communication device, at least one of i) a repetition mode of data transmissions to be sent to a second communication device, ii) a mapping between N indicated beams and scheduled transmissions of the data, or iii) a RV (Redundant Version) relationship among the scheduled transmissions of the data. In some implementations, the transmitting is based on at least one of the N indicated beam(s), a DMRS (Demodulation Reference Signals) port indication, or K time domain occasions, wherein N and K are non-negative integers.

Additional features and embodiments the above-described methods/techniques discussed above are described below using a clause-based description format.

1. A wireless communication method including: transmitting, by a first communication device, at least one of i) a repetition mode of data transmissions to be sent to a second communication device, ii) a mapping between N indicated beams and scheduled transmissions of the data, or iii) a RV (Redundant Version) relationship among the scheduled transmissions of the data, wherein the transmitting is based on at least one of the N indicated beam(s), a DMRS (Demodulation Reference Signals) port indication, or K time domain occasions, N and K being non-negative integers.

2. The wireless communication method of clause 1, wherein the scheduled transmissions of the data are scheduled by a single PDCCH (Physical Downlink Control Channel).

3. The wireless communication method of claim 1, wherein one of the N indicated beams represents a TCI (Transmission Configuration Indicator) state indicated by a DCI (Downlink Control Information), a SRS (Sounding Reference Signal) resource or resource set indicated by an SRI (Scheduling Request Indicator), or a RS (Reference Signal) indicated by a spatial-relation-information.

4. The wireless communication method of clause 1, wherein the repetition mode includes a FDM (Frequency Division Multiplexing) repetition mode in which the data is transmitted on at least two resource parts in frequency domain.

5. The wireless communication method of clause 1, wherein the repetition mode includes a TDM (Time Division Multiplexing) repetition mode in which the data is transmitted on at least two occasions in time domain.

6. The wireless communication method of clause 1, wherein the repetition mode includes a SDM (Spatial Division Multiplexing) repetition mode in which the data is transmitted on a same time and a same frequency but associated with different DMRS ports.

7. The wireless communication method of clauses 5 and 6, wherein the repetition mode includes a first combined mode of the TDM repetition and the SDM repetition.

8. The wireless communication method of clauses 4 and 5, wherein the repetition mode includes a second combined mode of the TDM repetition and the FDM repetition.

9. The wireless communication method of claim 1, wherein the repetition mode includes a non-repetition mode in which the data is transmitted without repetition.

10. The wireless communication method of clause 5 or 9, wherein for the TDM repetition mode or the non-repetition mode, a beam i within the N indicated beams used in a time domain occasion k is obtained by an equation, $$i = \left\lfloor \frac{k}{K/N} \right\rfloor,$$

wherein k is from 0 to K−1.

11. The wireless communication method of clause 4, 6, 7, or 8, wherein for the FDM repetition mode, the SDM repetition mode, the first combined mode, or the second combined mode, (beam i, beam i+1) within the N indicated beams used in the time domain occasion k is obtained as $$\left( i = 2\left\lfloor \frac{k}{2K/N} \right\rfloor, \; i+1 = 2\left\lfloor \frac{k}{2K/N} \right\rfloor + 1 \right),$$

wherein k is from 0 to K−1.

12. The wireless communication method of clause 11, wherein for the SDM repetition mode or the first combined mode, the beam i is used for indicated DMRS port(s) within a first allocated CDM (Code Division Multiplexing) group which corresponds to a first repetition in the time domain occasion k and the beam i+1 is used for other indicated DMRS port(s) which corresponds to a second repetition in the time domain occasion k.

13. The wireless communication method of clause 11, wherein for the FDM repetition mode or the second combined mode, the beam i is used for a first allocated frequency resource part which corresponds to a first repetition in the time domain occasion k and the beam i+1 is used for a second allocated frequency resource part which corresponds to a second repetition in the time domain occasion k.

14. The wireless communication method of clause 13, wherein a same DMRS port(s) are used for the first allocated frequency resource part and the second allocated frequency resource part.

15. The wireless communication method of clause 13, wherein a same frequency resource size is predefined for the first allocated frequency resource part and the second allocated frequency resource part when only one MCS (Modulation and Coding Scheme) value is indicated by a DCI.

16. The wireless communication method of clause 13, wherein the first allocated frequency resource part and the second allocated frequency resource part have frequency resource sizes that are associated with respective MCS values indicated by a DCI.

17. The wireless communication method of clause 1, wherein all data repetitions divided into T groups, RV relationships of the data repetitions within each group are predefined.

18. The wireless communication method of clause 17, wherein T=N, the data repetitions within a group are indicated with a same beam, and a relationship among RV values of first repetitions of the groups is predefined.

19. The wireless communication method of clause 17, wherein T has a value which is equal to 1 or N depending on a RRC (Radio Resource Control) signaling or frequency bands.

20. The wireless communication method of clause 1, wherein the method further includes transmitting two DMRS indications carrying a same DMRS port information but indicating at least one of i) a different repetition mode or ii) a different mapping between N indicated beams and the scheduled transmissions of the data.

21. The wireless communication method of clause 1, wherein the method further includes transmitting a DMRS port indication including some bits indicating at least one of i) a different repetition mode or ii) a different mapping between N indicated beams and the scheduled transmissions of the data.

22. The wireless communication method of clause 19 or 21, wherein N is greater than 1.

23. A wireless communications apparatus comprising a processor and a memory, wherein the processor is configured to read code from the memory and implement a method recited in any of clauses 1 to 22.

24. A computer program product comprising a computer-readable program medium code stored thereupon, the code, when executed by a processor, causing the processor to implement a method recited in any of clauses 1 to 22.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:
1. A wireless communication method, comprising:
configuring, by a first communication device, a repetition scheme of a second communication device;
indicating, by the first communication device, N Transmission Configuration Indicator (TCI) states in a Downlink Control Information (DCI) message to the second communication device, wherein K transmission occasions of a transport block (TB) of data correspond to the N TCI states and the repetition scheme; and performing, by the first communication device, transmission of the TB of data using the K transmission occasions, N and K being non-negative integers, wherein the repetition scheme includes at least one of a Frequency Division Multiplexing (FDM) repetition mode in which the data is transmitted on at least two non-overlapping resource parts in frequency domain and a Time Division Multiplexing (TDM) repetition mode in which the data is transmitted on at least two transmission occasions using non-overlapping resources in time domain, wherein, for the FDM repetition mode, (TCI state i, TCI state i+1) of the N TCI states are applied to a time domain occasion k, wherein $$\left(i = 2\left\lfloor \frac{k}{2K/N} \right\rfloor, i+1 = 2\left\lfloor \frac{k}{2K/N} \right\rfloor + 1\right),$$

and wherein k is from 0 to K−1, and wherein, for the TDM repetition mode, a TCI state i of the N TCI states is applied to a time domain occasion k, wherein $$i = \left\lfloor \frac{k}{K/N} \right\rfloor,$$

and wherein k is from 0 to K−1.

2. The wireless communication method of claim 1, further comprising:
indicating, by the first communication device, one or more Demodulation Reference Signal (DMRS) ports in the DCI message to the second communication device to enable the second communication device to determine the repetition scheme.

3. The wireless communication method of claim 1, wherein the repetition scheme further comprises a mode in which the data is associated with different DMRS ports corresponding to different Code Division Multiplexing (CDM) groups.

4. The wireless communication method of claim 3, wherein, for the mode in which the data is associated with different DMRS ports corresponding to different CDM groups, a TCI state i of the N TCI states corresponds to a first CDM group associated with a first DMRS port and a TCI state i+1 of the N TCI states corresponds to a second CDM group associated with a second DMRS port.

5. The wireless communication method of claim 1, wherein a redundancy version to be applied to one or more of the K transmission occasions is predefined.

6. The wireless communication method of claim 1, wherein data repetitions are divided into N groups, the data repetitions within a group of the N groups are indicated with a same beam, and a redundancy version (RV) to be applied to the data repetitions within the group is predefined.

7. A wireless communication method, comprising:
receiving, by a second communication device, an indication from a first communication device indicating N Transmission Configuration Indicator (TCI) states in a Downlink Control Information (DCI) message, wherein K transmission occasions of a transport block (TB) of data correspond to the N TCI states and a repetition scheme; and receiving, by the second communication device, transmission of the TB of data using the K transmission occasions, N and K being non-negative integers, wherein the repetition scheme includes at least one of a Frequency Division Multiplexing (FDM) repetition mode in which the data is transmitted on at least two non-overlapping resource parts in frequency domain and a Time Division Multiplexing (TDM) repetition mode in which the data is transmitted on at least two transmission occasions using non-overlapping resources in time domain, wherein, for the FDM repetition mode, (TCI state i, TCI state i+1) of the N TCI states are applied to a time domain occasion k, wherein $$\left(i = 2\left\lfloor \frac{k}{2K/N} \right\rfloor, i+1 = 2\left\lfloor \frac{k}{2K/N} \right\rfloor + 1\right),$$

and wherein k is from 0 to K−1, and wherein, for the TDM repetition mode, a TCI state i of the N TCI states is applied to a time domain occasion k, wherein $$i = \left\lfloor \frac{k}{K/N} \right\rfloor,$$

and wherein k is from 0 to K−1.

8. The wireless communication method of claim 7, further comprising:
receiving, by the second communication device, one or more Demodulation Reference Signal (DMRS) ports in the DCI message from the first communication device; and
determining, by the second communication device, the repetition scheme according to the one or more DMRS ports.

9. The wireless communication method of claim 7, wherein the repetition scheme further comprises a mode in which the data is associated with different DMRS ports corresponding to different Code Division Multiplexing (CDM) groups.

10. The wireless communication method of claim 9, wherein, for the mode in which the data is associated with different DMRS ports corresponding to different CDM groups, a TCI state i of the N TCI states corresponds to a first CDM group associated with a first DMRS port and a TCI state i+1 of the N TCI states corresponds to a second CDM group associated with a second DMRS port.

11. The wireless communication method of claim 7, wherein a redundancy version to be applied to one or more of the K transmission occasions is predefined.

12. The wireless communication method of claim 7, wherein data repetitions are divided into N groups, the data repetitions within a group of the N groups are indicated with a same beam, and a redundancy version (RV) to be applied to the data repetitions within the group is predefined.

13. A wireless communications apparatus comprising at least one processor that is configured to:
configure a repetition scheme of a second communication device;
indicate N Transmission Configuration Indicator (TCI) states in a Downlink Control Information (DCI) message to the second communication device, wherein K transmission occasions of a transport block (TB) of data correspond to the N TCI states and the repetition scheme; and perform transmission of the TB of data using the K transmission occasions, N and K being non-negative integers, wherein the repetition scheme includes at least one of a Frequency Division Multiplexing (FDM) repetition mode in which the data is transmitted on at least two non-overlapping resource parts in frequency domain and a Time Division Multiplexing (TDM) repetition mode in which the data is transmitted on at least two transmission occasions using non-overlapping resources in time domain, wherein, for the FDM repetition mode, (TCI state i, TCI state i+1) of the N TCI states are applied to a time domain occasion k, wherein $$\left(i = 2\left\lfloor \frac{k}{2K/N} \right\rfloor, i+1 = 2\left\lfloor \frac{k}{2K/N} \right\rfloor + 1\right),$$

and wherein k is from 0 to K−1, and wherein, for the TDM repetition mode, a TCI state i of the N TCI states is applied to a time domain occasion k, wherein $$i = \left\lfloor \frac{k}{K/N} \right\rfloor,$$

and wherein k is from 0 to K−1.

14. The wireless communications apparatus of claim 13, wherein the at least one processor is configured to indicate one or more Demodulation Reference Signal (DMRS) ports in the DCI message to the second communication device to enable the second communication device to determine the repetition scheme.

15. The wireless communications apparatus of claim 13, wherein the repetition scheme further comprises a mode in which the data is associated with different DMRS ports corresponding to different Code Division Multiplexing (CDM) groups.

16. The wireless communications apparatus of claim 15, wherein, for the mode in which the data is associated with different DMRS ports corresponding to different Code Division Multiplexing (CDM) groups, a TCI state i of the N TCI states corresponds to a first CDM group associated with a first DMRS port and a TCI state i+1 of the N TCI states corresponds to a second CDM group associated with a second DMRS port.

17. The wireless communications apparatus of claim 13, wherein a redundancy version to be applied to one or more of the K transmission occasions is predefined.

18. The wireless communication apparatus of claim 13, wherein data repetitions are divided into N groups, the data repetitions within a group of the N groups are indicated with a same beam, and a redundancy version (RV) to be applied to the data repetitions within the group is predefined.

19. A wireless communications apparatus comprising at least one processor that is configured to:

receive an indication from a first communication device indicating N Transmission Configuration Indicator (TCI) states in a Downlink Control Information (DCI) message, wherein K transmission occasions of a transport block (TB) of data correspond to the N TCI states and a repetition scheme; and receive transmission of the TB of data using the K transmission occasions, N and K being non-negative integers, wherein the repetition scheme includes at least one of a Frequency Division Multiplexing FDM) repetition mode in which the data is transmitted on at least two non-overlapping resource parts in frequency domain and a Time Division Multiplexing (TDM) repetition mode in which the data is transmitted on at least two transmission occasions using non-overlapping resources in time domain, wherein, for the FDM repetition mode, (TCI state i, TCI state i+1) of the N TCI states are applied to a time domain occasion k, wherein $$\left(i = 2\left\lfloor \frac{k}{2K/N} \right\rfloor, i+1 = 2\left\lfloor \frac{k}{2K/N} \right\rfloor + 1\right),$$

and wherein k is from 0 to K−1, and wherein, for the TDM repetition mode, a TCI state i of the N TCI states is applied to a time domain occasion k, wherein $$i = \left\lfloor \frac{k}{K/N} \right\rfloor,$$

and wherein k is from 0 to K−1.

20. The wireless communications apparatus of claim 19, wherein the at least one processor is configured to:

receive one or more Demodulation Reference Signal (DMRS) ports in the DCI message from the first communication device; and determine the repetition scheme according to the one or more DMRS ports.

21. The wireless communications apparatus of claim 19, wherein the repetition scheme further comprises a mode in which the data is associated with different DMRS ports corresponding to different Code Division Multiplexing (CDM) groups.

22. The wireless communications apparatus of claim 21, wherein, for the mode in which the data is associated with different DMRS ports corresponding to different CDM groups, a TCI state i of the N TCI states corresponds to a first CDM group associated with a first DMRS port and a TCI state i+1 of the N TCI states corresponds to a second CDM group associated with a second DMRS port.

23. The wireless communications apparatus of claim 19, wherein a redundancy version to be applied to one or more of the K transmission occasions is predefined.

24. The wireless communication apparatus of claim 19, wherein data repetitions are divided into N groups, the data repetitions within a group of the N groups are indicated with a same beam, and a redundancy version (RV) to be applied to the data repetitions within the group is predefined.

* * * * *